United States Patent
Han et al.

(10) Patent No.: US 11,372,128 B2
(45) Date of Patent: Jun. 28, 2022

(54) METHOD AND SYSTEM FOR DETECTING DOWNHOLE MAGNETIC INTERFERENCE ON MEASUREMENT WHILE DRILLING OPERATIONS

(71) Applicants: China Petroleum & Chemical Corporation, Beijing (CN); Sinopec Tech Houston, Houston, TX (US)

(72) Inventors: Jun Han, Houston, TX (US); Sheng Zhan, Houston, TX (US); Fengtao Hu, Houston, TX (US); Jinhai Zhao, Houston, TX (US)

(73) Assignee: CHINA PETROLEUM & CHEMICAL CORPORATION, Beijing (CN)

( * ) Notice: Subject to any disclaimer, the term of this patent is extended or adjusted under 35 U.S.C. 154(b) by 58 days.

(21) Appl. No.: 15/931,984

(22) Filed: May 14, 2020

(65) Prior Publication Data

US 2021/0356620 A1    Nov. 18, 2021

(51) Int. Cl.
*G01V 3/38* (2006.01)
*E21B 47/0228* (2012.01)
(Continued)

(52) U.S. Cl.
CPC ............ *G01V 3/38* (2013.01); *E21B 47/0228* (2020.05); *E21B 47/07* (2020.05); *E21B 47/13* (2020.05);
(Continued)

(58) Field of Classification Search
CPC .............. G01V 7/06; G01V 3/28; G01V 3/38; E21B 47/13; E21B 47/0228; E21B 47/07; E21B 47/26; G01P 15/18
(Continued)

(56) References Cited

U.S. PATENT DOCUMENTS

| 4,739,262 A | 4/1988 | Fleetwood |
| 4,761,889 A * | 8/1988 | Cobern ................. E21B 47/022 |
| | | 33/302 |

(Continued)

OTHER PUBLICATIONS

Andrew Buchanan, et. al.; Geomagnetic Referencing—The Real-Time Compass for Directional Drillers; Oilfiled Review Journal Autumn 2013:25 No. 3.
(Continued)

*Primary Examiner* — Michael P Nghiem
(74) *Attorney, Agent, or Firm* — Novick, Kim & Lee, PLLC; Allen Xue (57) ABSTRACT

A method and a system implementing the method, are disclosed for computing magnetic interferences in measurement while drilling operations, using the retrieved lateral, and axial magnetic interferences of the measurement while drilling downhole tool system. With the disclosed method and system of implementing the method, it can be determined whether the source of the magnetic interference is from the measurement while drilling downhole tool system lateral direction or its axial direction. When magnetic field strength is abnormal, the lateral and axial magnetic interferences are monitored, and then compared against their values before the abnormal magnetic field strength. This way the direction of the magnetic interference is analyzed to eliminate or judge the cause of the interference, and properly guide the measurement while drilling downhole tool system towards its reservoir or well location.

3 Claims, 5 Drawing Sheets

(51) Int. Cl.
*E21B 47/07* (2012.01)
*E21B 47/13* (2012.01)
*G01P 15/18* (2013.01)
*G01V 3/28* (2006.01)
*G01V 7/06* (2006.01)
*E21B 47/26* (2012.01)

(52) U.S. Cl.
CPC .............. *E21B 47/26* (2020.05); *G01P 15/18* (2013.01); *G01V 3/28* (2013.01); *G01V 7/06* (2013.01)

(58) Field of Classification Search
USPC ............................................................ 702/6
See application file for complete search history.

(56) References Cited

U.S. PATENT DOCUMENTS

| | | | |
|---|---|---|---|
| 5,126,666 A | 6/1992 | van Heyningen | |
| 5,136,242 A | 8/1992 | Abraham-Fuchs | |
| 6,529,834 B1 | 3/2003 | Estes | |
| 6,819,113 B2 | 11/2004 | von Wimmerspeg | |
| 7,252,144 B2 | 8/2007 | Estes | |
| 7,313,495 B2 | 12/2007 | Zeng | |
| 7,405,563 B2 | 7/2008 | Kruspe | |
| 7,523,359 B2 | 4/2009 | Fillatreau | |
| 8,185,312 B2 | 5/2012 | Ekseth | |
| 8,487,626 B2 | 7/2013 | Khan | |
| 9,411,065 B2 | 8/2016 | Estes | |
| 9,702,241 B2 | 7/2017 | Lozinsky | |
| 2007/0203651 A1 | 8/2007 | Blanz | |
| 2012/0001637 A1* | 1/2012 | Bittar | G01V 3/28 324/339 |
| 2019/0352896 A1 | 11/2019 | Han | |
| 2020/0131898 A1* | 4/2020 | Wu | G01V 3/30 |

OTHER PUBLICATIONS

Chinthaka P Gooneratne; Downhole Applications of Magnetic Sensors; Drilling Technology Team, Exploration and Petroleum Engineering Center—Advanced Research Center (EXPEC-ARC), Published Oct. 19, 2017.

* cited by examiner

METHOD AND SYSTEM FOR DETECTING DOWNHOLE MAGNETIC INTERFERENCE ON MEASUREMENT WHILE DRILLING OPERATIONS

TECHNICAL FIELD

The present disclosure generally relates to measurement while drilling operations wherein magnetometers are used to determine certain magnetic interference, and guide measurement while drilling downhole tool systems, by computing lateral and axial magnetic field strength values of measurement while drilling downhole tool.

BACKGROUND OF INVENTION

1. Measurement while Drilling Overview

Magnetic sensors have been used in a number of applications over the years, particularly in the fields of automotive, aerospace, biomedicine, computers systems, green energy generation, and robotics. Their utilization in those fields continues to increase at a rapid rate due to advancements made in the area of nano-technology fabrication. Yet, the application of magnetic sensors in the oil/gas industry, still remains a relatively unexplored area of research compared with some of the aforementioned applications.

Declining resources have forced oil and gas companies to drill deeper and in different directions (i.e. instead of just vertically), and in more extreme and unknown environments. Therefore, it is important to monitor and analyze downhole environments in real-time when drilling a well in order to make timely decisions to optimize efficiency as well as prevent costly errors. As such, directional drilling was developed, to deviate from a well's original vertical path to a predetermined trajectory, thereby allowing access to reservoirs that cannot be otherwise reached efficiently with a vertical well drilled from the surface. Moreover, by drilling multiple directional wells from a drilling platform rather than drilling several vertical wells, the drilling cost, impact on the environment, and health and safety issues can be reduced. However, when planning directional wells, there are many considerations that have to be taken into account, such as measurement while drilling systems, sensors, target location, shape and size, well trajectory, geological formations, adjacent wells, and rig surface facilities. The deviation of the well has to be accurately controlled in order to keep the trajectory of the well within the prescribed angle in order to reach the intended target. Failure to accurately drill a directional well can result in a 'dry hole', and significant financial losses for the company, as well as impacting their business strategy.

As such, to recover hydrocarbons, such as oil and gas from subsurface reservoirs, wells are created by a downhole measurement while drilling (MWD) system attached to above-surface MWD systems, wired or wireless connected to a telemetry system for sending and receiving pertinent information. These measurement-while-drilling incorporates the measurement tools into the drillstring and provides real-time information to help with steering the drill. The downhole MWD system generally contains a battery, a pulser, a pulser driver, a MWD downhole tool, and a rotating drill bit attached to a drill string end which is used to create boreholes (i.e. wellbores). As drilling has become more complex, with horizontal and directional drills increasing in numbers, well logging has also had to adapt and improve.

Although these boreholes are typically drilled vertically, directional drilling systems are also used to drill holes to increase hydrocarbon production. These modern directional drilling systems generally use a drill string, having a bottom hole assembly (BHA) and a drill bit at its end, a drill motor (i.e. flushing motor) while rotating the drill to create the borehole. The MWD downhole tool systems used during exploration may be further equipped with sensors, and compasses for measuring the wellbore temperature and well pressure, the drilling tool azimuth and the drill bit tilt. Other measuring devices are also used as a resistivity measuring device for determination the presence of hydrocarbons and water. As such, system performance will functionally depend on borehole inclination, azimuth, geomagnetic-field vector, geographical position, and other extrinsic values. This given more so by the fact that the magnetic field of the earth is primarily produced within its interior but also extends from the earth's outer core to the magnetopause thereby responsible for providing a shielding effect to the earth. Nevertheless, the problem does not stop there as magnetic fields are non-static as they change with time, given by the flow of the current in the upper atmosphere.

Therefore, a person having ordinary skills in the art would soon realize that the performance of the devices attached to MWD downhole tool systems, are extremely reliant on certain design elements, calibration performance, and quality control during operation of the MWD downhole tool systems. Yet, MWD downhole tool systems are also extremely dependent on other extrinsic factors, like sensing the Earth's spin rate through the use of gyro compassing tools, which take into consideration the latitude of wellbore location. As it can be observed by persons of ordinary skill in the art, the performance of these sensor, generally degrade as the inclination increases, especially in an east, or west direction at higher latitudes. Magnetic tools produce weaker horizontal components at high latitudes of the Earth's field, while errors increase at high east or west inclinations, because of the progressive difficulty in compensating for the effect of drill string magnetism. It has been further observed, that some potential causes of magnetic interference may be due to: (a) Drill strings; (b) imperfections in non-magnetic drill collars; (c) magnetic formations; (d) casing & adjacent wells; (e) the platform itself or sola winds at shallow perforations. As such, these types of magnetic interferences can be defined as the corruption of a geomagnetic field by a field from an external source, thereby causing disruption in obtaining proper survey readings mainly azimuth; from the magnetic sensors. Persons having skills in the art, will recognize than an error of 50 nT is considered to be the limit beyond which drilling is no longer accurate.

Besides the earth's magnetic field, significant changes in MWD tool measurement occur while drilling in areas, containing magnetic strata or localized magnetic geological units. These strata are responsible for creating substantial risk for those directional wells in which MWD tool is used as a surveying tool. Normally, persons of ordinary skills in the art may determine whether there is magnetic interference in measurement while drilling downhole tool systems, by comparing the difference of the local magnetic field strength to the measured and calculated magnetic field strength. If the difference is close, a person having ordinary skills in the art may think that there is no magnetic interference; if the difference is large, it may mean for a person having ordinary skills in the art, that there exists the presence of magnetic interference. Regardless, it is most evident in the art, that a drill string axial interference is probably the most common and frequent cause of errors in hole direction. In which case, the drill strings may be regarded as a steel-bar, dipole magnet.

To solve these magnetic interference problems, the normal approach for magnetic survey tools is to place the survey sensor within sufficient quantity of nonmagnetic drill collars in the bottomhole assembly (BHA). This minimizes azimuth measurement errors proportionally with the inverse of the square of the distance from the source, but leaves drill string magnetic interference almost untouched, mainly due to its more complex, dynamic nature which leads to a particular difficult task of removing interference completely.

Notwithstanding the aforementioned, there are several other techniques employed to correct the effects of magnetic interference, mainly based upon a common hypothesis which involves replacing the corrupted sensor measurements with values calculated from a model of local geomagnetic parameters, which allows azimuth estimation without interference errors. While these techniques in theory have been proved to be sound, in practice the available geomagnetic models are imperfect, resulting in potentially significant errors in the calculated azimuth.

Therefore, the combination of the aforementioned methods as demonstrated, suffer from a wide array of limitations which makes it difficult to conduct reliable and accurate readings, and thereby limiting a person skilled in the art to properly assess measurements while drilling. As such, in view of the known art, it is therefore seen as one object of the invention to improve and enhance known methods and systems for characterizing and recognizing magnetic interferences on measurement while drilling operations, to quickly and accurate compute an array of functions, whilst providing users of said methods and systems, typically a person skilled in the art, with full control and understanding of the conditioning processes applied, thereby instilling greater confidence and less uncertainty in the results of the measurement while drilling operations, for a subsequent reservoir characterization over a survey region having at least one hydrocarbon well or reservoir location.

2. Magnetometers

Since their inception in the 1930s, several types of magnetic sensors have been used to measure magnetic fields in a wide range of applications, and have recently progressed to solid-state sensors with the advancements made in nano and micro technologies. Typical parameters gathered by magnetometers involved a myriad of ranging from temperature to noise. These values allow for magnetometers to measure the Earth's magnetic field at measurable output with simple signal processing, while also assuring the integrity of the data collected.

Typically, a magnetometer consists of two coils, an excitation and a pick-up coil, wound around a ferromagnetic rod. The ferromagnetic rod is driven to saturation when a large alternating current is applied to the excitation coil by a waveform generator and a magnetic flux density is induced in the rod. As the rod is driven into saturation, it becomes progressively more difficult for a magnetic field lines to pass through the rod and induce a magnetic flux density. This reluctance of the rod is sensed by the pick-up coil, which creates changes in the voltage of the pick-up coil. Since the rod is driven to saturation twice during each excitation cycle, the second harmonic of the output voltage of the pick-up coil is extracted by phase demodulation circuitry. When the magnetometer is in the presence of an external magnetic field, such as the Earth's magnetic field, the induced magnetic flux density is distorted. This distortion is sensed by the pick-up coil causing a change in the output voltage; the magnitude corresponds to the strength of external magnetic field and the phase to the orientation of said magnetic filed.

For a single magnetic rod, the pick-up coil will sense two values comprising the output voltage, and the excitation voltage, thus making it challenging to filter out the second harmonic value, while obtaining its phase and rectifying it to obtain voltage proportional to the magnitude of the external field. In order to overcome this challenge two variants of the magnetometers where developed: (a) a Vacquier-type, and (b) a ring-core-type. Yet, with the advances in nano and micro fabrications, more cost effective magnetometers were developed using complementary metal-oxide semi-conductors (CMOS). Their size, compactness, low power consumption and the possibility of integration with electronics into integrated circuit boards, make them ideal candidates for portable devices. However, one of the major drawbacks of these types of magnetometers (mainly driven by their size) is the limited number of turns possible in the excitation and pick-up coils during the fabrication process. The limited number of turns in the excitation coil in these magnetometers results in the rod or core not being properly saturated, and in a pick-up coil leads to lower sensitivities than traditional magnetometers. Higher amplitudes and frequencies of the excitation current can be used to compensate for this drawback but at the cost of higher power consumption. Moreover, compared to traditional magnetometer manufacturing, there is a higher cost associated with microfabrication magnetometer manufacturing. The above clearly places further emphasis on post data acquisition processing, in order for directional well-drilling to accurately, and cost-effectively explore subsurface hydrocarbons.

3. Using Magnetometer on Measurement-while-Drilling Systems

Magnetic single and multi-shot surveys were the first instruments to measure both inclination (INC) and azimuth (AZI), and consisted of a magnetic compass, inclinometer and a camera controlled by an electronic timer. These single and multi-shot devices had to be run on wireline down a well or dropped down the drillstring assembly and retrieved after pulling the drillstring out of the well.

Later on, MWD systems were introduced that included tri-axial magnetometers, tri-axial accelerometers, and a mud-pulse telemetry system located above the fluxgate magnetometers and accelerometers. Stabilizers were used to control contact with the wellbore and form a fulcrum with the hydraulic motor behind it acting as a lever, thus allowing side force to be generated at the bit. Yet, because in directional drilling MWD systems are constantly being bent (inclined), the MWD magnetic values crosses over from magnetic toolface to gravitational toolface at different angles. Thus, the position of the drill bit in a well being drilled can be obtained at any time in terms of the magnetic field, inclination and toolface as shown by the below formulas:

$$P = \arctan\left(\frac{-(H_x\sin\varphi + H_y\cos\varphi)}{H_z\sin\theta + \cos\theta(H_x\cos\varphi - H_y\sin\varphi)}\right); \quad (1)$$

and:

$$\theta = \arctan\left(\sqrt{\frac{G_x^2 + G_y^2}{G_z^2}}\right); \quad (2)$$

and:

$$\varphi = \arctan\left(-\frac{G_y}{G_x}\right); \quad (3)$$

While drilling, there are predetermined survey points along the well where information about the azimuth, inclination and toolface is obtained. Values at a given survey station are combined with previous values to obtain the well trajectory, where the computations are based on mathematical assumptions. This data is transmitted to the surface so that the driller on the surface knows the exact direction in which the well is being drilled. This is time consuming since the rate of penetration into the earth is significantly lower during the sliding mode compared to the rotating mode. Therefore, in trying to solve this problem, the rate of penetration is increased causing the operator at the receiving systems to run the MWD system through highly magnetic environments. To overcome this issue magnetometers are enclosed in a nonmagnetic drill cover and run inside a well. Depending upon the 'proposed azimuth' and inclination, increasing amounts of non-magnetic drill collar are required to effectively isolate the magnetometers. This isolation further creates interference, that results in lagged information reaching the receiving systems for further maneuverability and control of the MWD system to toward the proposed reservoir direction. Hence, operators controlling MWD systems through receiving systems, tend to balance the disadvantages of using magnetometers to guide MWD systems, with that of directing the MWD system towards areas of no concern.

4. Guiding Techniques

Therefore, persons skilled in the art have developed multiple techniques to accurately guide MWD systems through wellbores accurately. One of those techniques is called geomagnetic referencing. This technique uses baseline models of an area, while incorporating the magnetic north, and the true north to convert magnetically determined orientations to geographic ones. This technique must account for an array of extrinsic factors, like secular variations in the main magnetic field models of the earth, as well as incorporate time-vary disturbances. Therefore, this technique requires of constant updates to its baseline models, in addition to multiple calibrations, and manual quality assurance checkpoints.

Then there's multistation wellbore analysis which compensates for drillstring magnetic interferences by using tools manufactured with non-magnetic materials to help isolate the components used to guide the MWD system. This technique further assesses the magnetic footprint of a BHA, while comparing against the earth's main magnetic filed as acquired at multiple survey station. The magnitude of perturbation will then depend on the orientation of the tool, relative to the magnetic field direction, and this information is used to guide the MWD system to the appropriate reservoir location.

Regardless of the techniques used, persons skilled in the art still have to account for the influence of the crustal field, the time varying disturbance fields, and/or any secular variations in the main magnetic field because they rely mostly on extrinsic data instead of values captured mainly during the measurement while drilling operations are taken place.

5. Disadvantages of Traditional MWD Methods

At present, MWD methods are based on different measuring principles. A typical MWD method is based on magnetic surveying technology. These methods are composed of two parts: an underground while-drilling unit and a ground-monitoring unit. The former is used to measure drilling parameters. The magnetometer, which is fixed in the internal place of the while-drilling unit, gets the geomagnetic components. With these data, the attitude information of the drilling bit could be obtained in the attitude calculation and display device. However, the geomagnetic field is easily interfered by the surrounding environment, such as iron ore and electromagnetic device, which is the main drawback of these kind of MWD methods. Besides, it results in increased cost due to the use of non-magnetic drilling string necessary for shielding the magnetometer.

The MWD system based on radiolocation principle has a radio transmitter in the while-drilling unit. The ground-monitoring unit, which is usually placed in drilling well entrance or the surface over the drilling trajectory, receives the radio signal and calculates the drilling bit's position by radio intensity. Because of the radio transmitter's limited power, this system could not be used in deep underground environment. The signal penetrability of radio transmitter subjects to the influence of stratum condition; as a consequence, the applications of this MWD system are limited. Furthermore, attitude information of the drilling bit is difficult to be measured accurately.

Most recently, a new type of MWD method based on inertial technology, was introduced, mainly comprising of equipping an MWD downhole system with a 3-axis accelerometer and a 3-axis gyroscope. This system during drilling process, would measure the drilling bit's acceleration and angular rotation, so the position and altitude of the drilling bit are obtained through an algorithmic calculation. Due to accumulated drift error of gyroscope, this MWD method frequently had degraded performance in long-term measurement and a high-performance fiber-optic gyroscope were generally introduced, which resulted in higher project costs. However, these methods and systems were still not able to obtain an effective data fusion between magnetometer and accelerometer.

Aiming at some defects of existing technology, the present embodiments of this invention introduces a new MWD method and system based entirely on magnetic interference theory, characterized with multiple sensors to improve the guiding performance, accuracy, and anti-disturbance ability of an MWD downhole system.

SUMMARY OF THE INVENTION

To guide a well to its desire location, measurement while drilling (MWD) systems need to be operated with utmost precision; however, its accuracy compromises as a result of magnetic interferences from drill string, nearby magnetic materials as well as environmental factors. The performance of these systems depends upon its sensors, and very little in post processing of the information gathered by them. As such, any distortion in sensor performance will lead to problems such as multiple sidetracking and increase in overall project cost. Solving the matter on measurement while drilling systems, has thus become the most concerned issue for directional well measurement.

Therefore, an object of the embodiments of the present invention involves determining post acquisition of data by the myriad of sensors placed on measurement while drilling systems (in particular, inclination, azimuth, toolface, and magnetic dip) whether the source of the magnetic interference is from the tool's lateral direction or the tool's axial direction, while constantly monitoring and comparing them with their values before any abnormal magnetic field strength. This post-acquisition method and system provides persons of ordinary skill in the art, with further tools to properly guide the MWD system throughout magnetic obstacles while reaching the reservoir at an optimized speed and with the least deviations.

Further details, examples and aspects of the invention will be described below referring to the drawings listed in the following.

BRIEF DESCRIPTION OF THE DRAWINGS

The teachings of the present invention can be readily understood by considering the following description in conjunction with the accompanying drawings.

DETAILED DESCRIPTION OF THE INVENTION

Reference will now be made in detail, to several embodiments of the present disclosures, examples of which, are illustrated in the accompanying figures. It is noted that wherever practicable similar or like reference symbols may be used in the figures and may indicate similar or like functionality. The figures depict embodiments of the present disclosure, for purposes of illustration only. One skilled in the art will readily recognize from the following description that alternative embodiments of the structures, systems, and methods illustrated therein may be employed without departing from the principles of the disclosure described herein.

Figure 1:
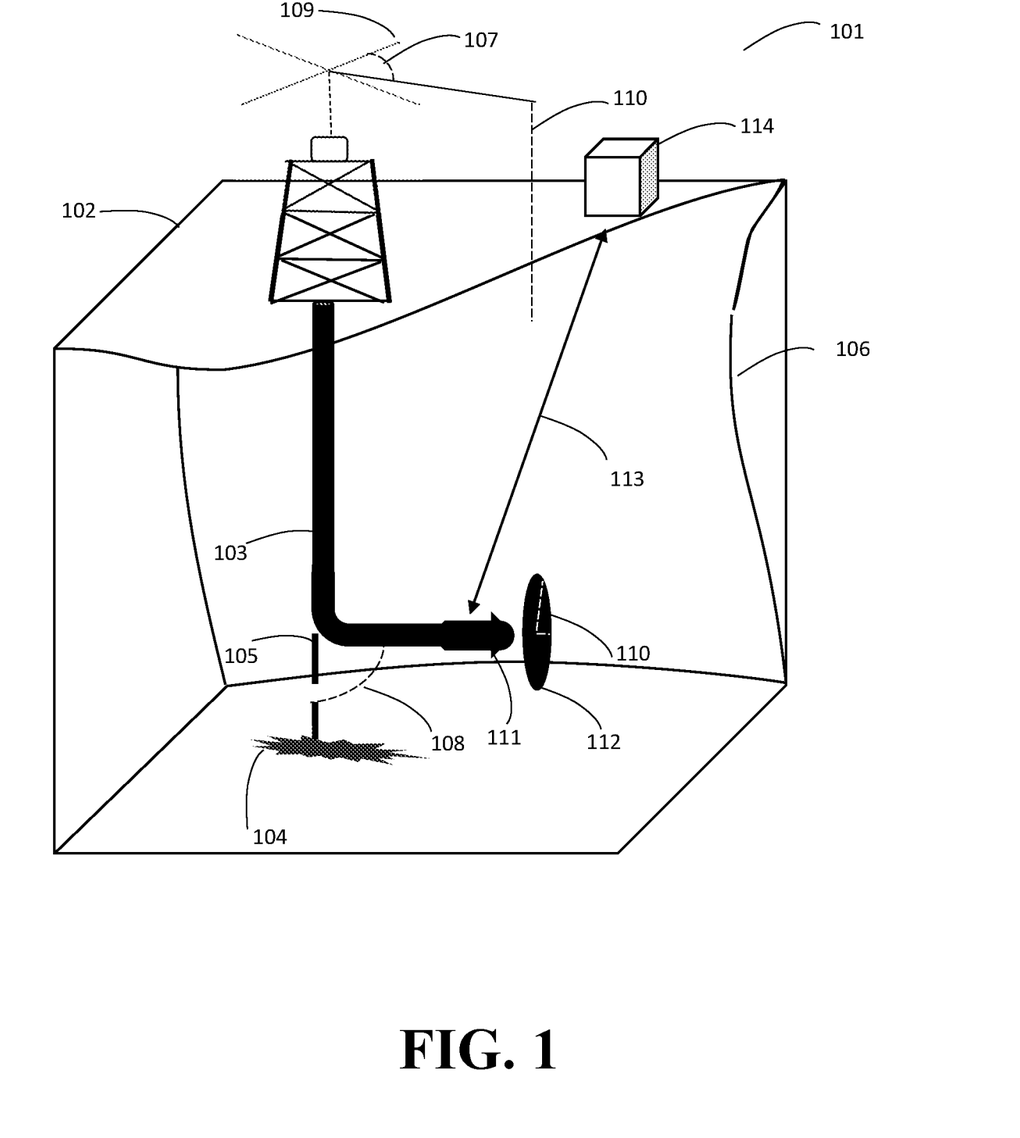
FIG. 1, is a schematic diagram showing a cross-sectional view of a survey region with a well location, a wellbore, a receiving system, and a measurement while drilling system as it is guided to the reservoir, according to an embodiment of the present disclosure.

FIG. 1 illustrates a seismic survey region, 101, over a land-based region represented as 102, in which the preferred embodiment of the present invention is useful. As observed in FIG. 1, when using MWD downhole systems 103 during directional drilling, in order to reach the well or reservoir 104, the MWD downhole system 103 must deviate from a vertical trajectory 105 to a trajectory that is kept within prescribed limits in the reservoir 106, of azimuth 107, and inclination 108 to reach a well or reservoir 104. This degree of deviation is given by a myriad of situations, but most likely due to populated or obstructed areas. The azimuth 107 is the deviation from the magnetic north 109 in the horizontal projection of the reservoir 106, and the inclination 108 from the well is the angle the well deviates from the vertical direction 105, represented in degrees. The azimuth 107 is defined as the orientation of the well, measured clockwise with respect to the magnetic north 109. The line along the vertical direction for vertical drilling, is always parallel to the Earth's gravitational field. The toolface (TF) 110, is the angle the drill bit 111 rotates on the drilling plane 112, from an initial reference point. As the MWD downhole system 103 is drilling through the Earth, it encounters the Earth's magnetic field which has a different strength and orientation at every location on Earth and this field is measured using tri-axial magnetic sensors (i.e. magnetometers), while the inclination from the well is obtained by measuring the gravitational field with tri-axial accelerometers. The magnetometers are used to measure the toolface 110 when the well is vertical (0 inclination) as the gravitational field will be constant, and accelerometers are used to measure the toolface 110, when the well is horizontal (90 inclination). Any toolface 110 measurement between an inclination of 0 and 90 is performed by both magnetometers and accelerometers. Generally the directional bend of the MWD downhole system 103 is adjusted according to the angle of the well being drilled and is normally set anywhere between 0 and 2 but sometimes as high as 3 degrees. Initially only the hydraulic motor powers the drill bit 111, and there is no rotation of the drilling assembly above the drill string. The motor can be oriented in any desired manner to build angle, drop angle or turn. Once the information is conveyed via telemetry system 113 to a receiving system 114 on the surface, the desired trajectory of the well is attained, and the entire drilling assembly and the bit are rotated to drill straight ahead as shown in FIG. 1.

Figure 2:
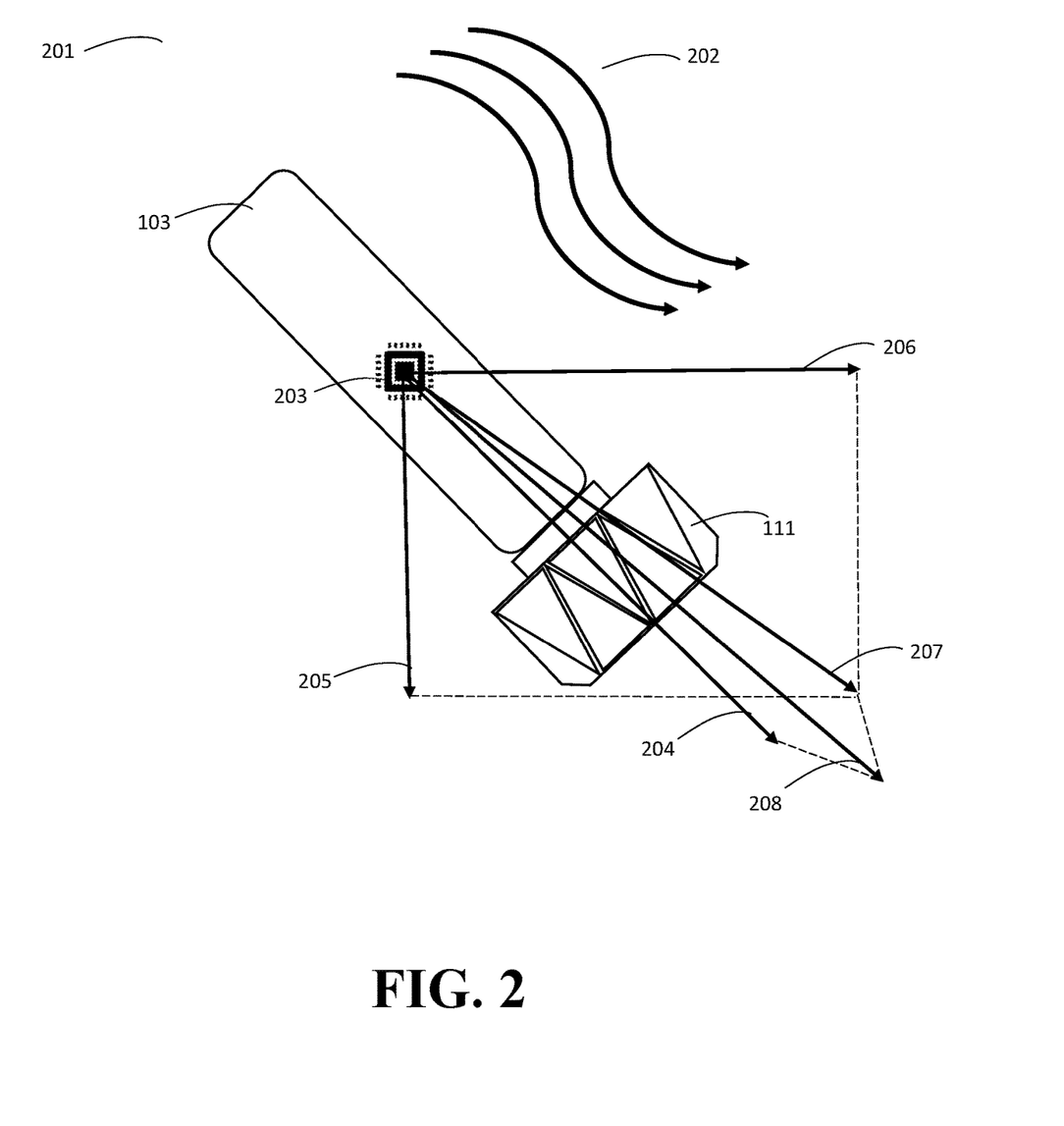
FIG. 2, is a schematic diagram of a measurement while drilling system, showing the various magnetic field components as they are encountered during operation, according to an embodiment of the present disclosure.

In FIG. 2, a side view of a portion of the MWD downhole system 103 is shown, attached to the drill bit 111 is illustrated as 201. The drill bit 111 is already off the vertical drilling direction 105 and drilling at the inclined angle 108. At this point, the magnetic interference from the drill string increases with increasing inclination. This happens because horizontal component of drill string become a larger percentage of the local magnetic field 202, thereby influencing magnetic readings, captured at the MWD downhole system's processing unit 203, comprising magnetic and accelerometer sensors, a telemetry system for communication back to the surface, a memory resource for locally storing the information, and a non-transitory computer readable memory device for processing the stored information, and executing the programmed language information on the MWD downhole system 103. Even after equipping the MWD downhole system 103, with non-magnetic interference collars, and spacing sensors to avoid more interference, the operator at the receiving system 114 will still have a difficult time interpreting the sent values, and therefore properly orienting the MWD downhole system 103 towards the desired location. Even, if the directional drilling is in a stable inclination and the axial 204 ($B_z$), lateral 205/206 ($B_x$, $B_y$), and lateral magnetic field strength measured ($B_{xy}$) 207 are normal, there are still many variables that an operator will have to account to continuously guide the MWD downhole system 103 towards its end location, such as, (1) stratum pyrite; (2) drilling bits; (3) adjacent wells interference; (4) damage of tool; and/or (5) non-magnetic drill collar magnetization; which all may cause an abnormal magnetic field strength. Hence further processing is required of the acquired values 204, 205, and 206, that cannot be done locally at the MWD downhole tool system 103, or from the receiving system 114 by just using the calculated value of 207. This further processing for $B_z$ 204 is derived when the geomagnetic field strength (TMF), the earth magnetic dip (DIP), the inclination angle (INC), the azimuth angle (AZI) are known, which are then calculated at the surface by a receiving system sent via a telemetry service using the following algorithms:

$$B_{xy} = B_m \times \left\{ 1 - \left[ \frac{1}{2} \times \left( \frac{\cos(AZI) \times \sin(INC)}{\cos(DIP)} + \frac{1}{\frac{\cos(AZI) \times \sin(INC)}{\cos(DIP)}} - \frac{\sin^2(AZI) \times \cos(DIP) \times \sin(INC)}{\cos(AZI)} - \right. \right. \right. \quad (4)$$

$$\left. \left. \left. \frac{\sin^2(DIP) \times \cos(AZI) \times \sin(INC)}{\cos(DIP)} - \frac{\cos^2(INC) \times \cos(DIP)}{\cos(AZI)} \right) - \cos(INC) \times \sin(DIP) \right]^2 \right\}^{\frac{1}{2}};$$

and $$B_z = B_m \times \left( \frac{1}{2} \times \left( \frac{\cos(AZI) \times \sin(INC)}{\cos(DIP)} + \frac{1}{\frac{\cos(AZI) \times \sin(INC)}{\cos(DIP)}} - \frac{\sin^2(AZI) \times \cos(DIP) \times \sin(INC)}{\cos(AZI)} - \right. \right. \quad (5)$$

$$\left. \left. \frac{\sin^2(DIP) \times \cos(AZI) \times \sin(INC)}{\cos(DIP)} - \frac{\cos^2(INC) \times \cos(DIP)}{\cos(AZI)} \right) - \cos(INC) \times \sin(DIP) \right).$$

Figure 3:
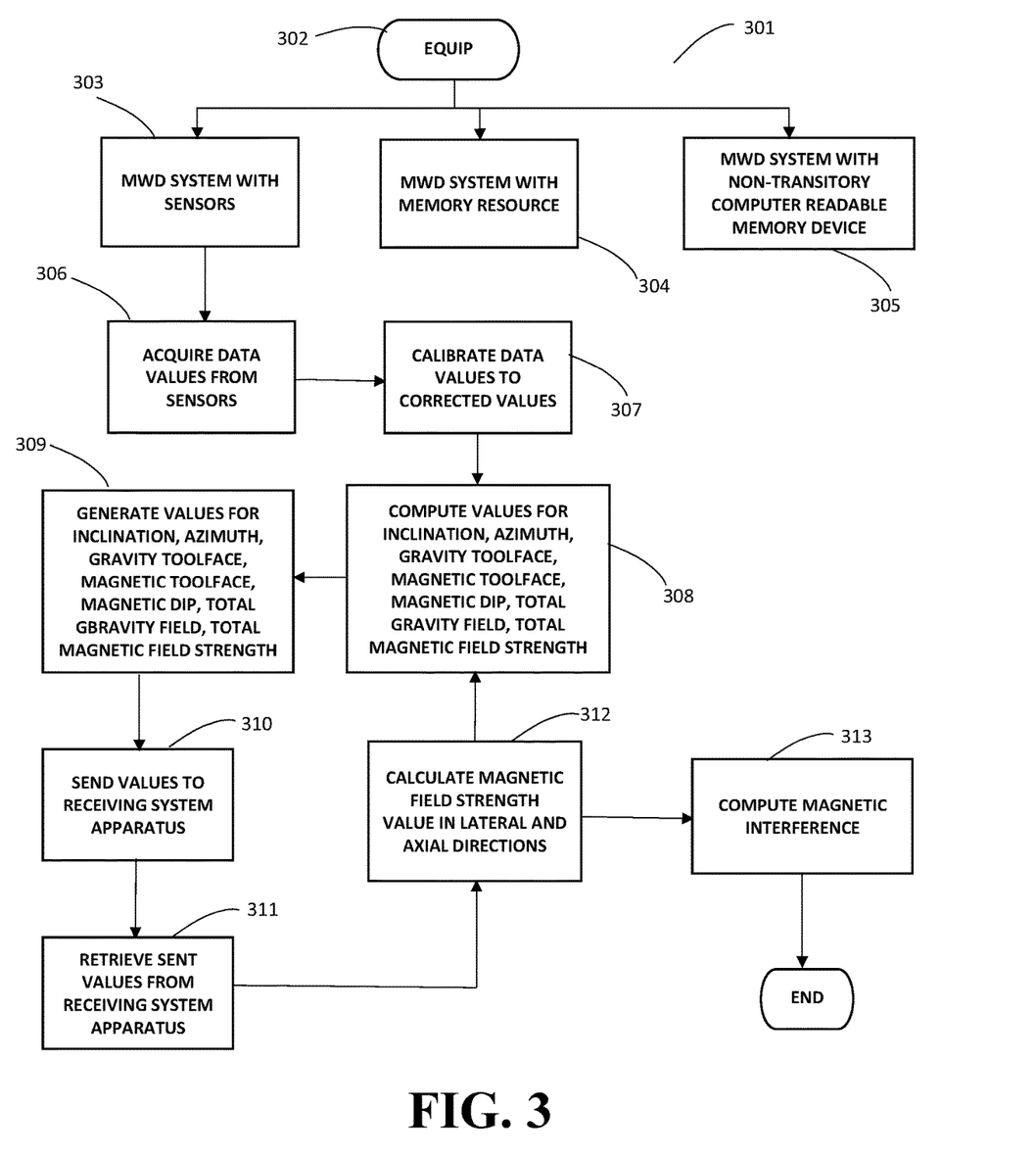
FIG. 3, is a flow chart showing the method for detecting downhole magnetic interference on measurement while drilling operations, according to an embodiment of the present disclosure.

As shown in FIG. 3, a proposed embodiment of the method, 301, initiates by properly equipping, 302, the MWD downhole tool system 104 with a three-axis accelerometer sensor, a three-axis magnetometer sensor, and a temperature sensor 303, a memory resource 304; and a non-transitory computer readable memory device 305. These are specifically needed for the proposed method to work, in order to guarantee a proper drilling procedure, a complete knowledge of the drilling bit's orientation and position to be reported in real time to the receiving system.

As the core of the MWD downhole system, the non-transitory computer readable memory device 305 executes control commands, sends control signals to sensors 303, stores data acquired 306 by the sensors 303 into the memory resource 304, calibrates then sensors and data at 307, and completes data processing tasks that can be done locally and do not require high processing computing systems. Two programmable ND converters (12-Bit and 8-Bit, eight external inputs) are integrated inside of it, which convert the outputs of the sensors to digital signals. Then, the processed data and other essential information are sent to the telemetry device using an asynchronous receiver/transmitter module, or the like who in turn communicates the stored data to the receiving system 114 for further processing.

In order to calculate displacement, pitch and roll of the drilling bit 111, the 3-axis accelerometer is used to measure orthogonal components of the acceleration of gravity when the drilling bit is stationary, the acceleration when the bit is moving, as well as to capture the altitude information in the form of roll angle as redundancy. The magnetometer measures direction and magnitude of Earth's magnetic fields. In order to provide temperature compensation for the output of the accelerometers, the digital thermometer is used to measure system's temperature during the drilling process. Yet, taking into account all the recovered data, the accuracy of azimuth will end up with the output error of magnetometer, and said error will be in most times, uncertain. Therefore, it is essential for MWD downhole system to give a definition of credibility which reflects the intensity of electromagnetic interference on measurements of inclination, azimuth, gravity toolface, magnetic toolface, magnetic dip, total gravity field, total magnetic field strength. These are computed at 308 by the non-transitory computer readable memory device 305, that are then stored at 309 onto the memory resource 304 to be later sent via telemetry at 310 to the receiving system 114 for later processing of magnetic interference. The receiving system 114 computes at 311 the lateral and axial field magnetic strength values for the MWD downhole system, and baselines the initial location of the drill bit 111. The receiving system messages the non-transitory computer readable memory device 305 on the MWD downhole system to adjust positioning and repeats the steps of computing updated measurements of inclination, azimuth, gravity toolface, magnetic toolface, magnetic dip, total gravity field, total magnetic field strength. These updated measurements are again stored at 309 onto the memory resource 304 which are later sent via telemetry at 310 to the receiving system 114. Once again, the receiving system 114, computes the lateral and axial field magnetic strength values for the MWD downhole system at 311, and compares the updated measurements against the baselines to update the magnetic interference value at 312. Based upon the value obtained from this computation, a person having ordinary skills in the art operating the receiving system 114, would be able to adjust the location of the drill bit 111 for adequate performance, direction and exploration of the well. Once the well is reached, the process is considered finalized.

Figure 4:
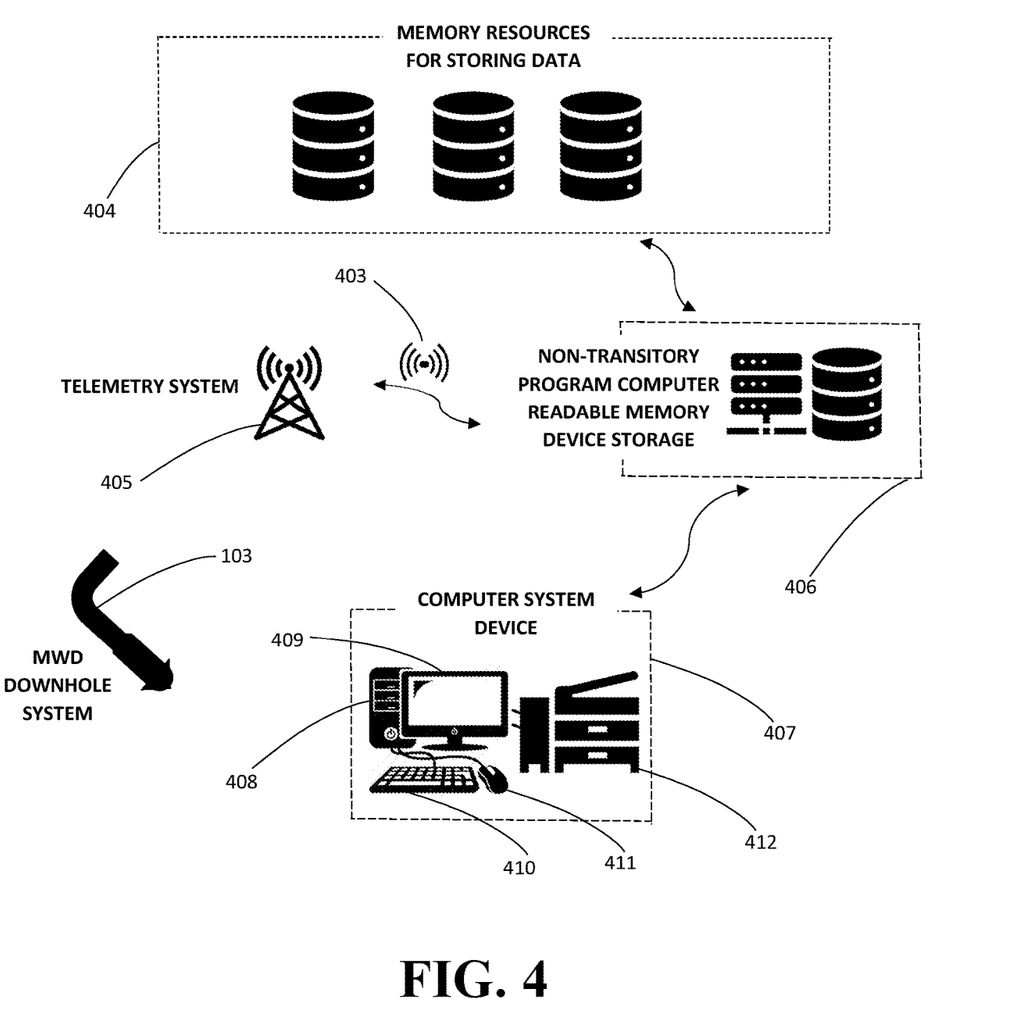
FIG. 4, is an electric diagram, in block form of the receiving system apparatus programmed to perform the method for detecting downhole magnetic interference on measurement while drilling operations, according to an embodiment of the present disclosure.
Figure 5:
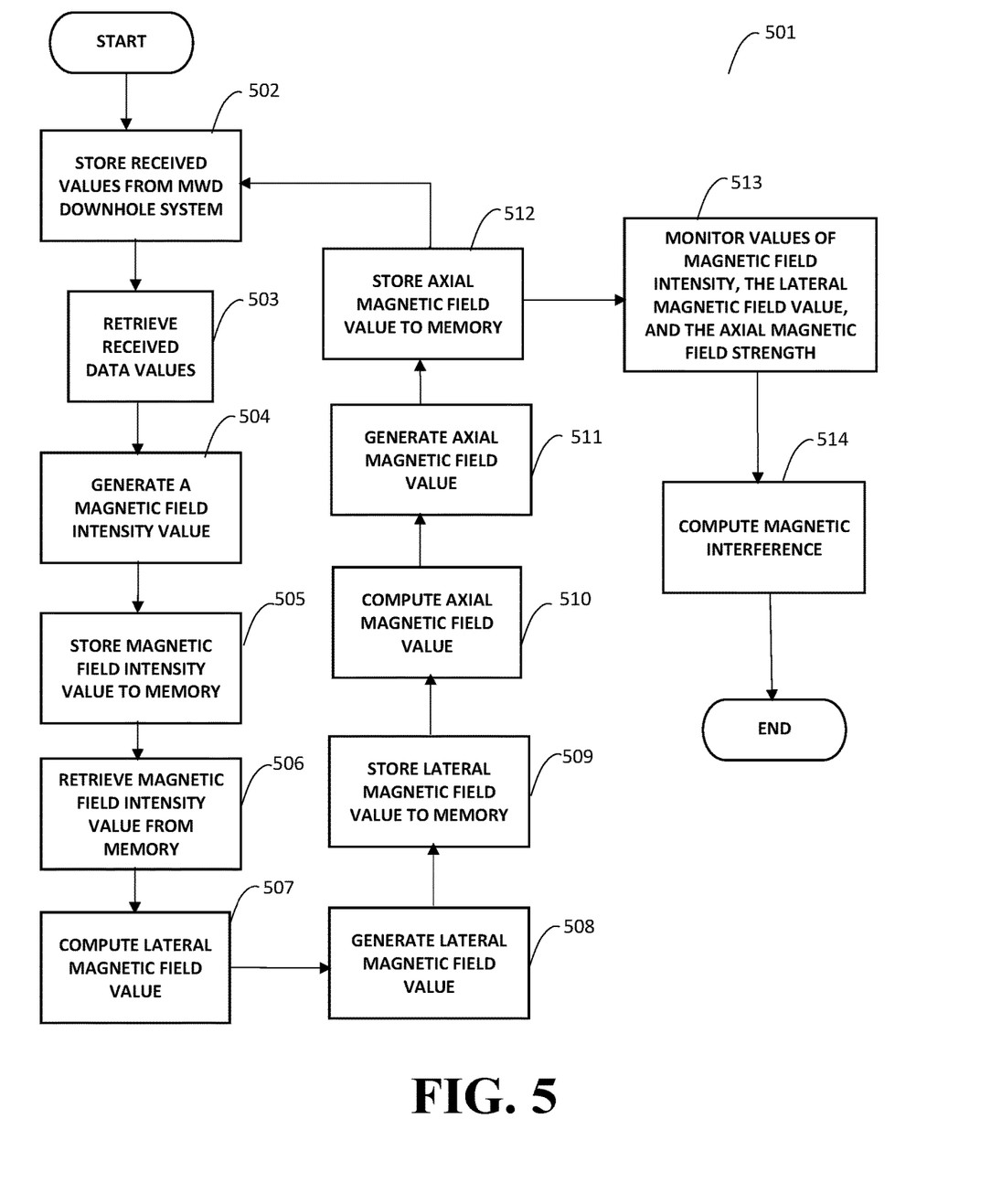
FIG. 5, is a flow chart showing the receiving system apparatus programmed to perform a set of operations on a measurement while drilling downhole system for detecting magnetic interferences, according to an embodiment of the present disclosure.

As it pertains to FIG. 4, it illustrates a functional block diagram of a receiving system 114 used to perform an array of operations of the method illustrated by 301 and 501 used for detecting magnetic interferences. The receiving system 114, retrieves in a parallel, and continuous operation the data values generated and stored at, 309 to compute the wave magnetic interferences for the MWD downhole tool system by calculating the change between each stored value of the lateral magnetic field value, and the axial magnetic field strength, using the stored magnetic field strength value after each repeated step. The receiving system 114 further incorporates (wired and/or wirelessly) memory resources 404 for storing data transmitted from the sensors 203, using wireless transmission systems, like telemetry 405 and received wirelessly, 403; a computer system device, 407; and a non-transitory program computer readable memory device storage, 406.

The computer system device, 407, acts as a user interface to the non-transitory program computer readable memory storage device, 406; to input, set, select, and perform the operations of retrieving, computing, generating, invoking, determining, converting, and correcting functions (the message hook procedures). Said computer system device, 407, is connected to (wired and/or wirelessly) to the non-transitory program computer readable memory storage device 406. The computer system device, 407, further includes other devices like a central processing unit (CPU), 408, a display or monitor, 409, a keyboard, 410, a mouse, 411, and a printer, 412.

The system computer 407 has firmware and software providing for the connection and interoperability of the multiple connected devices, like the memory resources for storing data, 404, the non-transitory program computer readable memory device storage, 406, and the computer system device, 407. The system computer 407 includes an operating system, a set of message hook procedures, and a system application.

The operating system embedded within the system computer 407 may be a Microsoft "WINDOWS" operating system, OS/2 from IBM Corporation, UNIX, LINUX, Sun Microsystems, or Apple operating systems, as well as myriad embedded application operating systems, such as are available from Wind River, Inc.

The message hook procedures of system computer 407 may, for example, represent an operation or command of the memory resources, 404, the computer system device, 407, the non-transitory program computer readable memory storage device, 406, which may be currently executing a certain step process or subroutine from the computer-implemented method for small cave recognition using seismic reflection data.

The set of message hook procedures may be first initiated by an input from: the user, like the entering of user-defined values or parameters; the manipulation of the computer system device, 407; the processing of operations in the non-transitory program computer readable memory device storage, 406; or automatically once certain data has been stored or retrieved by either the memory resources, 404, or the non-transitory program computer readable memory device storage, 406. Based on any of these inputs, processes or manipulation events, the memory resources, 404, the non-transitory program computer readable memory storage device, 406, or the computer system device, 407; generate a data packet that is passed to the system computer 407 which are indicative of the event that has occurred as well as the event that needs to occur. When system computer 407 receives the data packet, it converts it into a message based on the event, and executes the required step of the computer-implement method. The computer-implement method includes a set of message hook lists that identifies the series of message hook procedures. When the operating system receives the message, it examines the message hook list to determine if any message hook procedures have registered themselves with the operating system. If at least one message hook procedure has registered itself with the operating system, the operating system passes the message to the registered message hook procedure that appears first on the list. The called message hook executes and returns a value to the system computer 407 that instructs the system computer 407 to pass the message to the next registered message hook, and either 404, 406 or 407. The system computer 407 continues executing the operations until all registered message hooks have passed, which indicates the completion of the method by the identification of magnetic inference 313.

After the last message hook procedure has passed or been issued, the computer system device displays through a user-interface, on display 410, a message that indicates to the end user that the system computer 407 has completed executing method, and is ready to display on 410, and print on 412, a lateral magnetic field value, an axial magnetic field value, and a magnetic interference.

In FIG. 5, a flowchart 501 illustrates the set of operations the receiving system apparatus is programmed to perform, on a measurement while drilling downhole system 103, for detecting magnetic interferences. Said operations are performed by a non-transitory computer readable memory device, 406, that is connected to a computer system device 407, a memory resource 404, and a telemetry system 405. A message hook procedure initiated by the computer system device 407 after receiving data values, 303, 304, and 305 initializes the user-interface of the non-transitory computer readable memory device, 406, and displays on computer system device 407 a selection for the user of the receiving system 114 to store the received values at 502, on the receiving system's memory resource 404. Once said data is stored at 404, the non-transitory computer readable memory device, 406, sends a message to the computer system device 407 indicating that it has been stored in the memory resource, 404. The non-transitory computer readable memory device 406, then retrieves the data values at 503, and begins generating at 504, a magnetic field intensity value. Once said value is generated at 504, the non-transitory computer readable memory device 406 sends a message hook to the system computer 407, to store the magnetic field intensity value at 505, into the memory resource 404. The system computer 407, then retrieves 506 the magnetic field intensity value from the memory resource 404 and signals the non-transitory computer readable memory device 406 to begin computing lateral magnetic field value 507 using the pre-programmed algorithm (4). The non-transitory computer readable memory device 406 then generates, and outputs at 508, the lateral magnetic field value. Once the generation and output step 508 is completed, the non-transitory computer readable memory device, 406, then stores the lateral magnetic field value at 509 onto the memory resource 404, and sends a message to the computer system device 407 to confirm the storage of said values. Once the computer system device 407 via an operator of said system confirms the storage, it sends a message to the non-transitory computer readable memory device, 406, to continue with the computing of the axial magnetic field value at 510 using the pre-programmed algorithm (5). The non-transitory computer readable memory device 406 then generates, and outputs at 511, the axial magnetic field value. Once the generation and output step 511 is completed, the non-transitory computer readable memory device, 406, then stores the axial magnetic field value at 512 onto the memory resource 404, and sends a message to the computer system device 407 to confirm the storage of said values. The non-transitory computer readable memory device, 406 initiates subroutine 513 wherein the values stored at 505, 509, and 512 are monitored for changes, and the magnetic interference is computed at 514. Once step 514 is completed, the non-transitory computer readable memory device, 406 messages the computer system device 407 to confirm the value of the magnetic interference, and makes the necessary adjustments to the trajectory of the MWD downhole system 103. Generally, a person having ordinary skills in the art is able to determine whether there is magnetic interference on a MWD downhole system by comparing the difference of the local magnetic field strength against the measured and calculated magnetic field strength. If the difference is close, a person having ordinary skills in the art may assume no magnetic interference; if the difference is large, it assumes that there is magnetic interference. With the proposed embodiments of this invention, a person having ordinary skills in the art, will be able to accurately determine, without the need of assumption, whether magnetism is actually interfering with the MWD downhole system 103, thereby making real-time, and precision adjustments to the MWD downhole system 103.

As such, once the operator of the receiving system 114 makes the necessary performance, and directional adjustments to the MWD downhole system, the computer system device 407 signals the non-transitory computer readable memory device, 406 to repeat steps 502 through 512. For every loop of repeated steps, the stored values are monitored, and the magnetic interference computed at 514. The operations will end, once the operator of the receiving system 114, via the computer system device 407, confirms that the MWD downhole system 103 has reached the reservoir.

Unless specifically stated otherwise, terms such as "defining", "creating", "including", "representing", "pre-analyzing", "pre-defining", "choosing", "building", "assigning", "creating", "introducing", "eliminating", "re-meshing", "integrating", "discovering", "performing", "predicting", "determining", "inputting", "outputting", "identifying", "analyzing", "using", "assigning", "disturbing", "increasing", "adjusting", "incorporating", "simulating", "decreasing", "distributing", "specifying", "extracting", "displaying", "executing", "implementing", and "managing", or the like, may refer to the action and processes of a receiving system, or other electronic device, that transforms data represented as physical (electronic, magnetic, or optical) quantities within some electrical device's storage, like memory resources, or non-transitory computer readable memory, into other data similarly represented as physical quantities within the storage, or in transmission or display devices.

According the preferred embodiment of the present invention, certain hardware, and software descriptions were detailed, merely as example embodiments and are not to limit the structure of implementation of the disclosed embodiments. For example, although many internal, and external components of the receiving system apparatus of FIG. 4 have been described, those with ordinary skills in the art will appreciate that such components and their interconnection are well known. Additionally, certain aspects of the disclosed invention may be embodied in software that is executed using one or more, receiving systems, computers systems devices, or non-transitory computer readable memory devices. Program aspects of the technology may be thought of as "products" or "articles of manufacture" typically in the form of executable code and/or associated data that is carried on, or embodied in, a type of machine readable medium. Tangible non-transitory "storage" type media and devices include any or all memory or other storage for the computers, process or the like, or associated modules thereof such as various semiconductor memories, tape drives, disk drives, optical or magnetic disks, and the like which may provide storage at any time for the software programming.

As used herein the term "survey region" refers to an area or volume of geologic interest, and may be associated with the geometry, attitude and arrangement of the area or volume at any measurement scale. A region may have characteristics such as folding, faulting, cooling, unloading, and/or fracturing that has occurred therein.

As used herein, the term "computing" encompasses a wide variety of actions, including calculating, determining, processing, deriving, investigation, look ups (e.g. looking up in a table, a database or another data structure), ascertaining and the like. It may also include receiving (e.g. receiving information), accessing (e.g. accessing data in a memory) and the like. Also, "computing" may include resolving, selecting, choosing, establishing, and the like.

As used herein, the term "trim static", "static trimming" is used to refer to any time shift that is estimated from the cross-correlation process and applied directly to the input trace.

As used herein, "subsurface", and "subterranean" means beneath the top surface of any mass of land at any elevation or over a range of elevations, whether above, below or at sea level, and/or beneath the floor surface of any mass of water, whether above, below or at sea level.

Embodiments disclosed herein also relate to computer-implemented system, used as part of the receiving system for performing the operations herein. This system may be specially constructed for the required purposes, or it may comprise a general-purpose computer selectively activated or reconfigured by a computer program or code stored in the memory resources, or non-transitory computer readable memory. As such, the computer program or code may be stored or encoded in a computer readable medium or implemented over some type of transmission medium. A computer-readable medium includes any medium or mechanism for storing or transmitting information in a form readable by a machine, such as a computer ('Machine' and 'computer' may be used synonymously herein). As a non-limiting example, a computer-readable medium may include a computer-readable storage medium (e.g., read only memory ("ROM"), random access memory ("RAM"), magnetic disk storage media, optical storage media, flash memory devices, etc.). A transmission medium may be twisted wire pairs, coaxial cable, optical fiber, or some other suitable wired or wireless transmission medium, for transmitting signals such as electrical, optical, acoustical or other form of propagated signals (e.g., carrier waves, infrared signals, digital signals, etc.)).

A receiving system as used herein, typically includes at least hardware capable of executing machine readable instructions, as well as the software for executing acts (typically machine-readable instructions) that produce a desired result. In addition, a receiving system may include hybrids of hardware and software, as well as computer sub-systems.

Hardware generally includes at least processor-capable platforms, such as client-machines (also known as servers), and hand-held processing devices (for example smart phones, personal digital assistants (PDAs), or personal computing devices (PCDs)). Further, hardware may include any physical device that can store machine-readable instructions, such as memory or other data storage devices. Other forms of hardware include hardware sub-systems, including transfer devices such as modems, modem cards, ports, and port cards, for example.

Software includes any machine code stored in any memory medium, such as RAM or ROM, and machine code stored on other devices (such as non-transitory computer readable media like external hard drives, or flash memory, for example). Software may include source or object code, encompassing any set of instructions capable of being executed in a client machine, server machine, remote desktop, or terminal.

Combinations of software and hardware could also be used for providing enhanced functionality and performance for certain embodiments of the disclosed invention. One example is to directly manufacture software functions into a silicon chip. Accordingly, it should be understood that combinations of hardware and software are also included within the definition of a retrieving system and are thus envisioned by the invention as possible equivalent structures and equivalent methods.

Computer-readable mediums or memory resources include passive data storage, such as a random-access memory (RAM) as well as semi-permanent data storage such as external hard drives, and external databases, for example. In addition, an embodiment of the invention may be embodied in the RAM of a computer to transform a standard computer into a new specific computing machine.

Data structures are defined organizations of data that may enable an embodiment of the invention. For example, a data structure may provide an organization of data, or an organization of executable code. Data signals could be carried across non-transitory transmission mediums and stored and transported across various data structures, and, thus, may be used to transport an embodiment of the invention.

The system computer may be designed to work on any specific architecture. For example, the system may be executed on a high-performance computing system, which typically comprise the aggregation of multiple single computers, physically connected, or connected over local area networks, client-server networks, wide area networks, internets, hand-held and other portable and wireless devices and networks.

An "output device" includes the direct act that causes generating, as well as any indirect act that facilitates generation. Indirect acts include providing software to an user, maintaining a website through which a user is enabled to affect a display, hyperlinking to such a website, or cooperating or partnering with an entity who performs such direct or indirect acts. Thus, a user may operate alone or in cooperation with a third-party vendor to enable the reference signal to be generated on a display device. A display device may be included as an output device, and shall be suitable for displaying the required information, such as without limitation a CRT monitor, a LCD monitor, a plasma device, a flat panel device, or printer. The display device may include a device which has been calibrated through the use of any conventional software intended to be used in evaluating, correcting, and/or improving display results (e.g., a color monitor that has been adjusted using monitor calibration software). Rather than (or in addition to) displaying the reference image on a display device, a method, consistent with the invention, may include providing a reference image to a subject. "Providing a reference image" may include creating or distributing the reference image to the subject by physical, telephonic, or electronic delivery, providing access over a network to the reference, or creating or distributing software to the subject configured to run on the subject's workstation or computer including the reference image. In one example, providing of the reference image could involve enabling the subject to obtain the reference image in hard copy form via a printer. For example, information, software, and/or instructions could be transmitted (e.g., electronically or physically via a data storage device or hard copy) and/or otherwise made available (e.g., via a network) in order to facilitate the subject using a printer to print a hard copy form of reference image. In such an example, the printer may be a printer which has been calibrated through the use of any conventional software intended to be used in evaluating, correcting, and/or improving printing results (e.g., a color printer that has been adjusted using color correction software).

A database, or multiple databases may comprise any standard or proprietary database software, such as Oracle, Microsoft Access, SyBase, or DBase II, for example. The database may have fields, records, data, and other database elements that may be associated through database specific software. Additionally, data may be mapped. Mapping is the process of associating one data entry with another data entry. For example, the data contained in the location of a character file can be mapped to a field in a second table. The physical location of the database is not limiting, and the database may be distributed. For example, the database may exist remotely from the server, and run on a separate platform. Further, the database may be accessible across the a local network, a wireless network of the Internet.

Furthermore, modules, features, attributes, methodologies, and other aspects can be implemented as software, hardware, firmware or any combination thereof. Wherever a component of the invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the invention is not limited to implementation in any specific operating system or environment.

Various terms as used herein are defined below. To the extent a term used in a claim is not defined below, it should be given the broadest possible definition persons in the pertinent art have given that term as reflected in at least one printed publication or issued patent.

As used herein, "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined Additionally, the flowcharts and block diagrams in the Figures illustrate the architecture, functionality, and operation of possible implementations of systems, methods, and computer program products according to various embodiments of the present disclosure. It should also be noted that, in some alternative implementations, the functions noted in the block may occur out of the order noted in the Figures. For examples, two blocks shown in succession may, in fact, be executed substantially concurrently, or the blocks may sometimes be executed in the reverse order, depending upon the functionality involved. It will also be noted that each block of the block diagrams and/or flowcharts illustration, and combinations of blocks in the block diagrams and/or flowchart illustration, can be implemented by special purpose hardware-based systems that perform the specified hardware functions or acts, or combinations of special purpose hardware and computer instructions.

While in the foregoing specification this disclosure has been described in relation to certain preferred embodiments thereof, and many details have been set forth for purpose of illustration, the invention is not to be unduly limited to the foregoing which has been set forth for illustrative purposes.

On the contrary, a wide variety of modifications and alternative embodiments will be apparent to a person skilled in the art, without departing from the true scope of the invention, as defined in the claims set forth below. Additionally, it should be appreciated that structural features or method steps shown or described in any one embodiment herein can be used in other embodiments as well.

| Symbols Table | |
|---|---|
| Symbol | Brief Definition |
| AZI | Azimuth value |
| $B_m$ | Actual Total Magnetic Field Value |
| $B_x$, and $B_y$ | Lateral magnetic field strength values |
| $B_{xy}$ | Calculated Magnetic field strength in lateral directions |
| $B_z$ | Magnetic field strength in axial direction |
| DIP | Magnetic Dip value |
| INC | Inclination value |
| TF | Toolface value |
| TMF | Calculated Total Magnetic Field value |
| TGF | Total Gravity Field |
| $G_x, G_y, G_z$ | Orthogonal gravitational vectors measured by accelerometers |
| θ | Inclination angle |
| φ | Toolface angle |

We claim:

1. A system for detecting magnetic interferences, comprising:
   a measurement while drilling downhole tool system comprising a three-axis accelerometer sensor, a three-axis magnetometer sensor, a temperature sensor, a memory resource for storing data corresponding to operations of acquiring, computing, and generating, and a non-transitory computer readable memory device;
   a telemetry system for sending and receiving data of inclination, azimuth, gravity tool face, magnetic tool face, magnetic dip, total gravity field strength, and total magnetic field strength, connected to the measurement while drilling downhole tool system;
   a computer system output device;
   wherein the non-transitory computer readable memory device is coupled to the memory resource, coupled to the telemetry system, coupled to the computer system output device, and is programmed to perform operations of:
      storing the received data of inclination, azimuth, gravity tool face, magnetic tool face, magnetic dip, total gravity field strength, and total magnetic field strength to the memory resource;
      retrieving the stored data of inclination, azimuth, gravity tool face, magnetic tool face, magnetic dip, total gravity field strength, and total magnetic field strength from the memory resource;
      computing a magnetic field intensity using the retrieved data of inclination, azimuth, gravity tool face, magnetic tool face, magnetic dip, total gravity field strength, and total magnetic field strength;
      generating a magnetic field intensity from a computed total magnetic field strength;
      storing the generated magnetic field intensity to the memory resource;
      retrieving the stored magnetic field intensity from the memory resource;
      computing a lateral magnetic field intensity using the retrieved data of inclination, azimuth, gravity tool face, magnetic tool face, magnetic dip, total gravity field strength, and total magnetic field strength, and the retrieved magnetic field intensity;
      storing the computed lateral magnetic field intensity to the memory resource;
      computing an axial magnetic field strength using the retrieved data of inclination, azimuth, gravity tool face, magnetic tool face, magnetic dip, total gravity field strength, and total magnetic field strength, and the retrieved magnetic field intensity;
      storing the computed axial magnetic field strength to the memory resource;
      repeating the steps of storing received data, retrieving the stored data, generating a magnetic field intensity, storing the generated magnetic field intensity, retrieving the stored magnetic field intensity, computing a lateral magnetic field intensity, storing the lateral magnetic field intensity, computing an axial magnetic field strength, and storing the axial magnetic field strength;
      monitoring a stored magnetic field intensity, a stored lateral magnetic field intensity, and a stored axial magnetic field strength for every repeated step;
      determining a difference between the stored magnetic field intensity and a local magnetic field intensity after every repeated step;
      determining a presence of magnetic interference based on a magnitude of the difference; and
      computing the magnetic interference for a measurement while drilling downhole tool system by calculating a change in the stored lateral magnetic field intensity and a change in the stored axial magnetic field strength.

2. The system of claim 1, wherein computing the lateral magnetic field intensity comprises an expression:

$$B_{xy} = B_m \times \left\{ 1 - \left[ \frac{1}{2} \times \left( \frac{\cos(AZI) \times \sin(INC)}{\cos(DIP)} + \frac{1}{\frac{\cos(AZI) \times \sin(INC)}{\cos(DIP)}} - \frac{\sin^2(AZI) \times \cos(DIP) \times \sin(INC)}{\cos(AZI)} - \frac{\sin^2(DIP) \times \cos(AZI) \times \sin(INC)}{\cos(DIP)} - \frac{\cos^2(INC) \times \cos(DIP)}{\cos(AZI)} \right) - \cos(INC) \times \sin(DIP) \right]^2 \right\}^{\frac{1}{2}}.$$

3. The system of claim 1, wherein computing the axial magnetic field strength comprises an expression:

$$B_z = B_m \times \left( \frac{1}{2} \times \left( \frac{\cos(AZI) \times \sin(INC)}{\cos(DIP)} + \frac{1}{\frac{\cos(AZI) \times \sin(INC)}{\cos(DIP)}} - \frac{\sin^2(AZI) \times \cos(DIP) \times \sin(INC)}{\cos(AZI)} - \frac{\sin^2(DIP) \times \cos(AZI) \times \sin(INC)}{\cos(DIP)} - \frac{\cos^2(INC) \times \cos(DIP)}{\cos(AZI)} \right) - \cos(INC) \times \sin(DIP) \right).$$

* * * * *